INVENTOR.
JAMES E. BARTOW
BY
Harry M. Saragovitz
ATTORNEY

Oct. 15, 1957 J. E. BARTOW 2,809,787

COMPUTER FOR DESIGNING FORWARD SCATTER PROPAGATION SYSTEMS

Filed Oct. 23, 1956 6 Sheets-Sheet 2

INVENTOR.
JAMES E. BARTOW

BY

Harry M. Saragovitz
ATTORNEY

Oct. 15, 1957 J. E. BARTOW 2,809,787

COMPUTER FOR DESIGNING FORWARD SCATTER PROPAGATION SYSTEMS

Filed Oct. 23, 1956 6 Sheets-Sheet 3

*INVENTOR.*
JAMES E. BARTOW

*BY*

Harry M. Saragovitz
*ATTORNEY*

INVENTOR.
JAMES E. BARTOW
BY
Harry M. Saragovitz
ATTORNEY

Oct. 15, 1957 J. E. BARTOW 2,809,787

COMPUTER FOR DESIGNING FORWARD SCATTER PROPAGATION SYSTEMS

Filed Oct. 23, 1956 6 Sheets-Sheet 5

INVENTOR.
JAMES E. BARTOW

BY Harry M. Saragovitz
ATTORNEY

INVENTOR.
JAMES E. BARTOW
BY
Harry M. Saragovitz
ATTORNEY

United States Patent Office 2,809,787

Patented Oct. 15, 1957

2,809,787

COMPUTER FOR DESIGNING FORWARD SCATTER PROPAGATION SYSTEMS

James E. Bartow, Eatontown, N. J.

Application October 23, 1956, Serial No. 618,168

3 Claims. (Cl. 235—84)

(Granted under Title 35, U. S. Code (1952), sec. 266)

The invention described herein may be manufactured and used by or for the Government for governmental purposes, without the payment of any royalty thereon.

Until recently (about six years ago) radio communication has been limited to utilization of electromagnetic waves propagated either directly from the transmitting station to the receiving station (line-of-sight transmission), or beyond the horizon by reflection from the ionosphere or the tropopause, or the ground, or a combination of these reflections.

Recent experiments and discoveries resulting have demonstrated that it is possible to achieve very reliable beyond-the-horizon radio communication in V. H. F. and U. H. F. (including also S. H. F.) parts of the radio spectrum, utilizing what has come to be known as "scatter," or "forward scatter" propagation of magnetic waves either in the ionized gases regions of the stratosphere (particularly the "E" region or layer), or in the troposphere.

Discoveries made include the demonstration that while transmission may be accomplished in a single stage over considerable beyond-the-horizon distances (up to 1,400 miles) by utilizing the ionosphere, only low V. H. F. frequencies are effective and practicable for such communication; but these and U. H. F. may be effectively transmitted to distances up to 600 miles in the troposphere. Thus telegraphic signals such as Teletype and facsimile may be carried on by ionospheric scatter transmission, but U. H. F. and voice communication, or television are not satisfactorily effected in that region. On the other hand, transmission of voice and television signals by forward scatter propagation through the troposphere has been readily accomplished up to 500 miles.

In the designing and engineering of systems utilizing tropospheric scatter propagation of a wave beam, many factors limiting or making possible such communication including some newly observed or of newly acquired importance must be taken into consideration in determining the practicability of a proposed line, path or system of such communication.

It is therefore an object of this invention to facilitate the determination of the practicability of setting up a useful tropospheric scatter communication system over a proposed path between stated points of origin and reception of information signals.

A specific aim of the invention is to embody a simple rotary slide-rule type of computer tool or measure, which may be readily manufactured and easily manipulated to carry out in a simple way the mathematical processes necessary to determine the power output of a given transmitter to effect satisfactory and reasonably continuous communication over a proposed path, or to indicate whether or not reception of forward scatter signals from an available source is practicable.

Additional objects, advantages, and features of invention will be found in the following description of the device embodied, and from the herein described manner of its use, as well as from the accompanying drawings illustrating the article and its field of use, wherein.

Referring more particularly to the subject of the requirements of use of the device illustrated, it may be pointed out that it is intended to interpret the effects and requirements of some of the principal factors affecting the design and operation of a receiving and transmitting system operating by tropospheric scatter propagation of electromagnetic waves.

It should be understood that while techniques have been developed for effecting scatter transmission with a satisfactory degree of certainty, transmission is not a highly efficient one, since it is achieved in the face of antagonistic influences and obstacles which tend to obscure or lose signals sent, and success is obtained by definitely discovering and evaluating such obstacles or dampening or nullifying effects or factors, then applying adequate power to the input at the transmitter and adopting expedients at the receiver sufficient to leave at the receiver a resultant effective component of the signal transmitted which can be discriminated and amplified as a useful communication.

Among the principal deleterious factors encountered in ascertaining what, at a particular location, will limit transmission and reception of useful signals, there are the following which must be sensed, evaluated, and their equivalent alegbraic resultant applied to the production of useful received distinguishable signal.

(1) Noise internally generated in receiver sets.

(2) External electrical noise, manifest in the atmosphere and local interference by wire or radio signal transmission and power line transmission.

(3) Transmission losses: A function of path length, terrain, frequency, latitude, climate and season.

(4) Differences in the effectiveness of reception by single antenna, dual diversity and triple diversity.

(5) Antenna-to-medium coupling loss.

(6) The prevalence of unfavorable local conditions, subject to yearly recurrence.

The foregoing and other factors are readily integrated and set up in the embodiment of my invention herein disclosed, or by adaptation of terms and scales.

In addition there are occasional or rare conditions which may affect the requirements of a station more or less, according to the particular case, and these may be taken into consideration according to the effect on the resultant reception of signals transmitted with a given power output from the transmitter.

As to occasional or rare occurrences it is possible to incorporate in my device provision for registering the scale evaluation thereof at an appropriate scale and pointer, as an obvious carrying forward of the invention.

Figure 2:
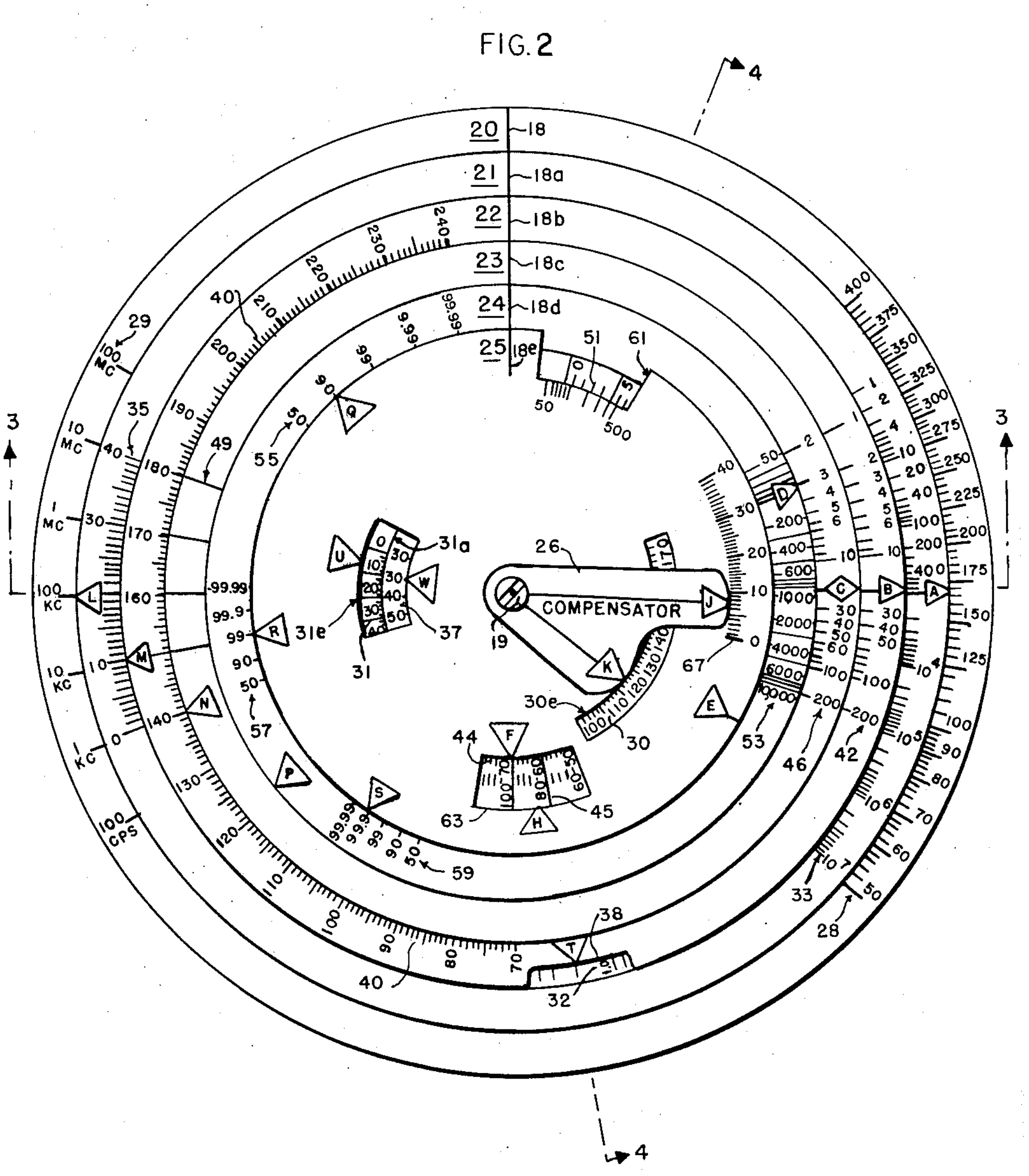
Figure 2 is a top view of a computer device embodying my invention.
Figure 3:
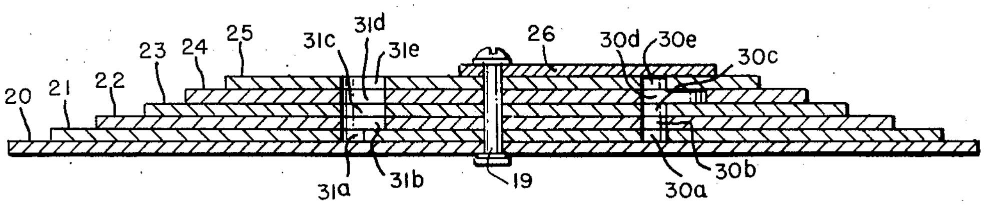
Figure 3 is a cross section thereof on the line 3—3 of Fig. 2.
Figure 4:
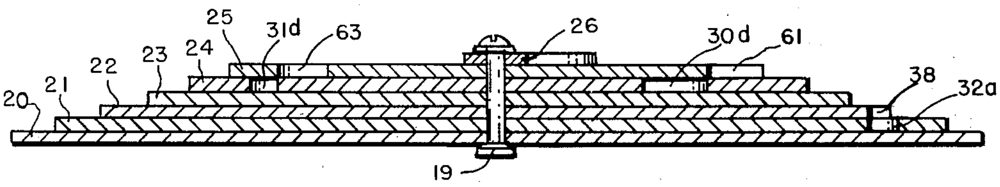
Figure 4 is a similar view on the line 4—4 of Figure 2.
Figures 5, 10:
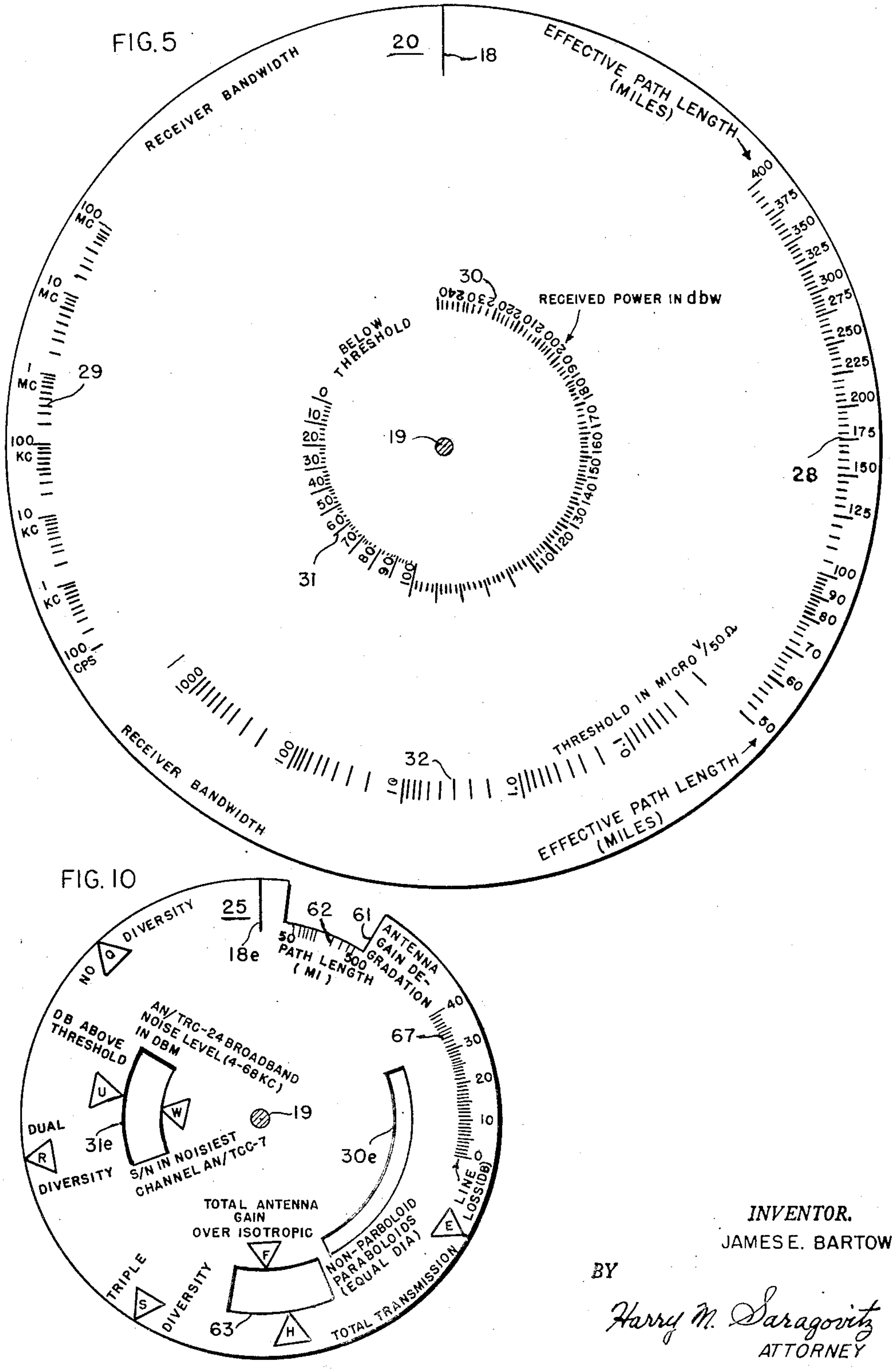
Figure 5 is a fragmentary plan view of the base member of the computer.
Figure 10 is a similar view of the sixth member.
Figures 6, 9:
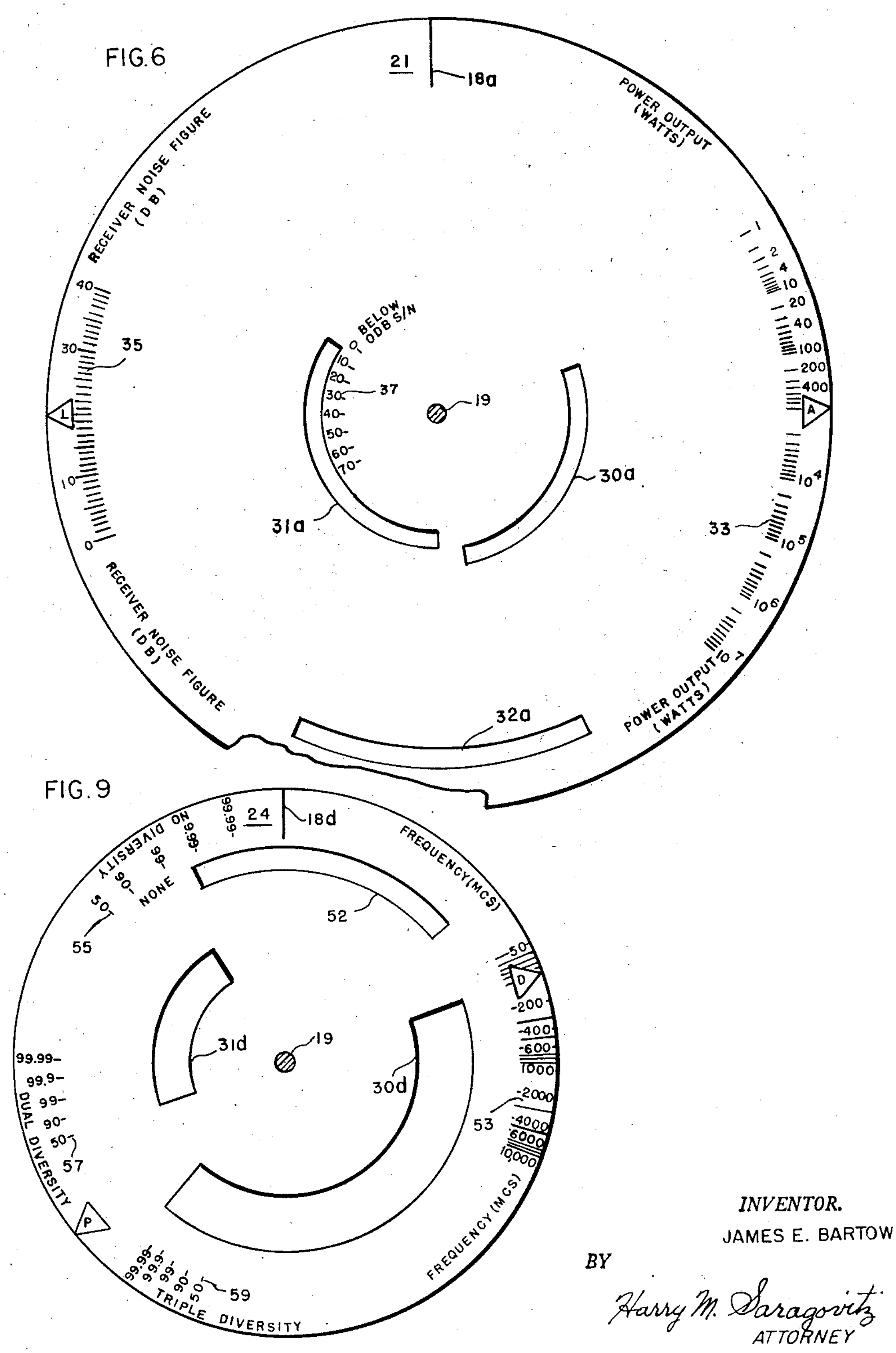
Figure 6 is a similar view of the second member of the device.
Figure 9 is a similar view of the fifth member.
Figures 7, 8:
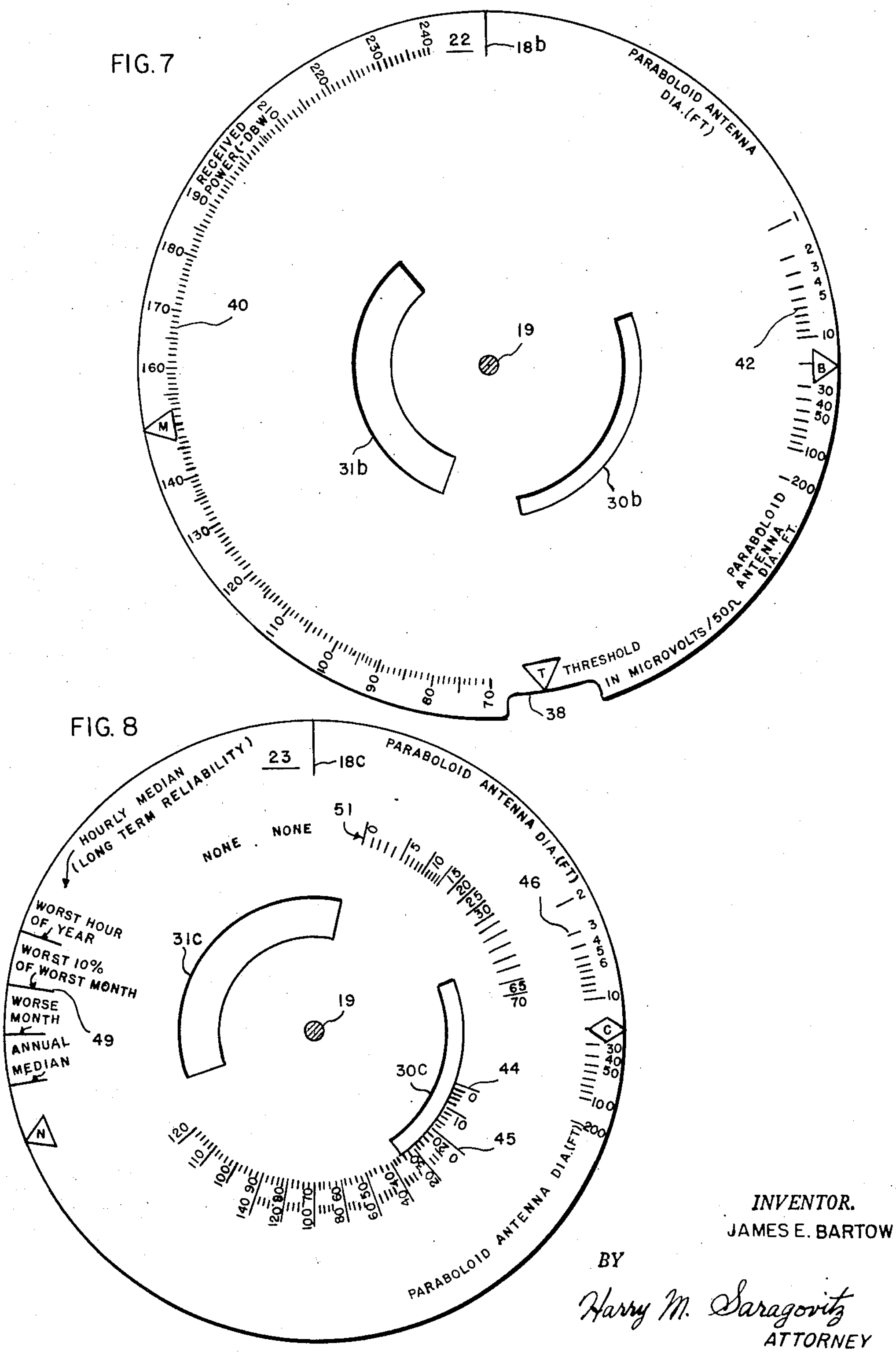
Figure 7 is a similar view of the third member or disc of the device.
Figure 8 is a similar view of the fourth member.

But for practical and expeditious determination of the requirements affecting the design and operation of a forward scatter radio communication system, and especially preliminary decisions it has been found sufficient to design the computer device with principal factors universally requiring consideration as in the device shown in Figure 2, allowing interpolation of applicable phenomena values according to the need in a particular case.

Figure 1:
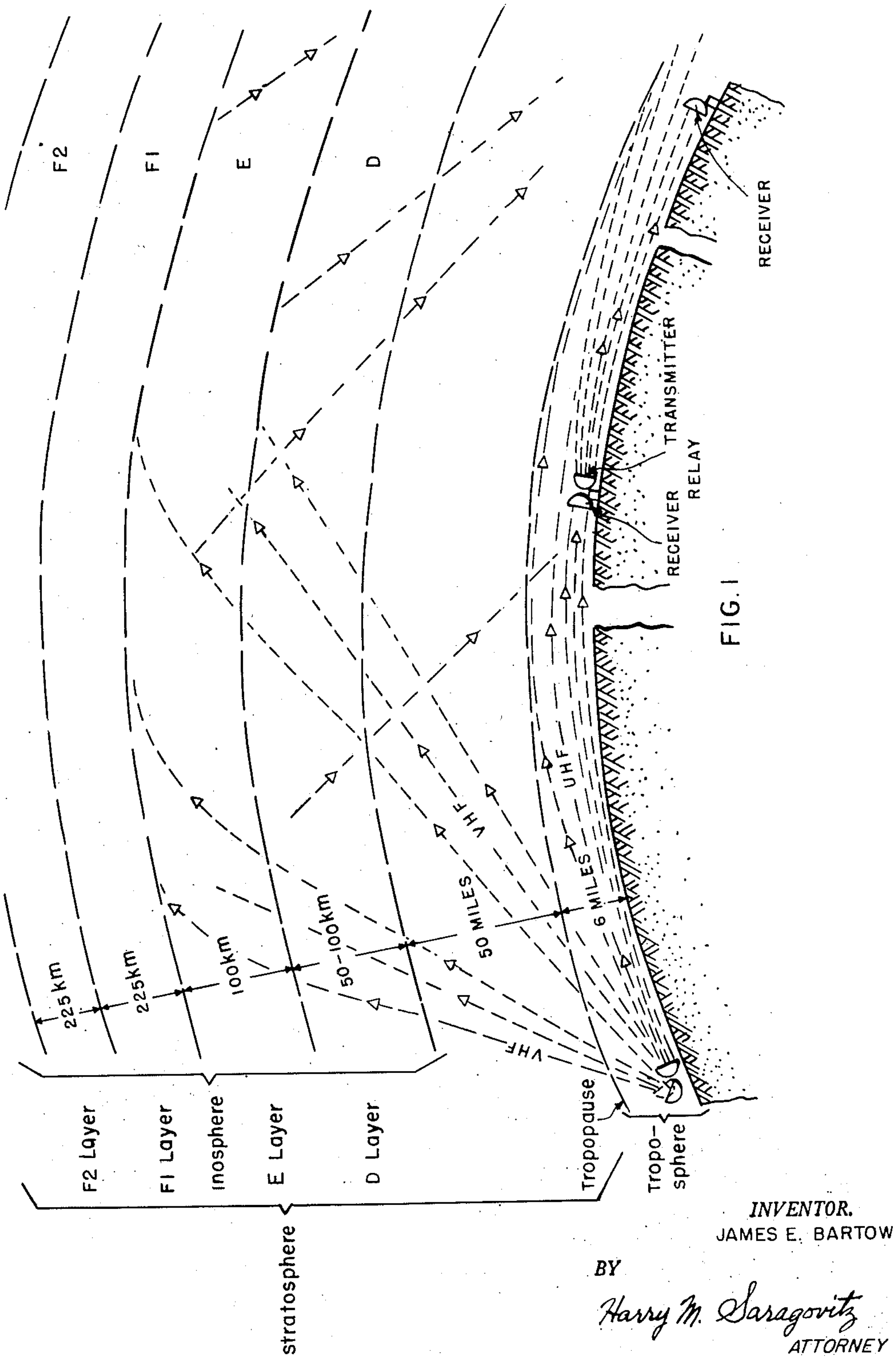
Figure 1 is a diagrammatic representation of a sector of the earth, the troposphere, and certain layers or strata of the stratosphere and the ionosphere.

Referring specifically to the drawing, Figure 1 is a conventional diagrammatic representation of a section of the earth and the principal strata of air, gases, ions and electrons, as conventionally identified "layers," the lowermost being the troposphere, usually considered to have a depth of about six miles, the upper limit of which is commonly known as the tropopause. This layer is characterized by relatively dense gases, changes in air density and temperature directly proportionate to increase in height, and convection currents, and it terminates rather sharply at the upper limit of cloud formation and convection movements. Above this is the stratosphere, comprising an upper portion of the atmosphere with a depth of 50 or 60 miles (varying with latitude) in which season or weather have no material effect, it being almost isothermal throughout, with an absence of water vapor and practically no convection movements. Above this region is what has been termed the D region, layer or stratum the lowest of the ionosphere the ion and electron density of which is low. The computer device of the present invention is, however, used for tropospheric scatter propagation computations only.

On account of these limitations a limited number of generalized phenomena or related manifestations can be evaluated, and I have designed and originated a computer for mathematically utilizing essential factors to compute a value of signal which may be expected at a given point of reception when a stated power is applied to the transmission of the signal at a particular distant point of origin. In the practical application of these computations I have produced a form of slide rule peculiarly fitted for and applicable to the computations, and forming the principal subject of this disclosure.

Referring more particularly to Fig. 2, a rotary slide rule is shown consisting of a base member or plate 20 of any suitable material (either rectangular or circular), having a centrally located pivot 19 thereon. In practice it is a disc approximately 10 inches across. This plate may be considered to have a top area having a zero or fiduciary mark 18 at its edge which, with similar marks on superposed members each independently revolvable on the pivot 19, is used to establish an initial setting or zero relation for the computer discs to be described. Superposed in succession on this base plate there are calculater or computer discs 21, 22, 23, 24, 25 (having respectively fiduciary marks 18*a*, 18*b*, 18*c*, 18*d*, and 18*e*), and a small compensator sector 26, all independently pivoted on the pivot 19, the lowermost one being of a diameter less than the least transverse measurement or diameter of the base plate 20, and the others in order being less in diameter than the one next below, allowing room on the exposed margins for the printing of linear scales and legends indicating the nature of respective factors and their values in computations, according to the relative positions of the discs and of fiduciary marks and pointers or indexes to coact with scales on the subjacent respective plate members, as will be described.

On the base member in the right hand part of the latter there is printed an approximately logarithmic curved scale 28 concentric with the pivot and just without the border of the disc 21 and also graduated and marked with figures for miles of length of the path of transmission or propagation involved, the values ascending counter clockwise from 50 to 400 over an arc of approximately 80 degrees on the dial. At the opposite side of the base 20 there is also formed a logarithmic scale 29 of suitable extent for representing the band widths which it is possible to utilize at the receiver, reading in values clockwise from 100 C. P. S. to 100 mc. over an arc of 60 degrees.

This base plate 20 is further provided at its right hand side with a small radius scale 30 for indicating received power in dbw, this scale extending over 190 degrees of arc about the pivot 19, and reading counterclockwise to 240 db, while at the left hand side of the pivot there is formed another scale 31 of still smaller radius and of less angular extent than the scale 30, marked in values of decibels above threshold from zero counterclockwise to 100 db over an arc of 100 degrees. The divisions of both of these scales are of equal intervals for like measures of value. The scale 30 does not include zero or values near zero, but may start at 100 db or lower and by units of 10 extend to the value of say, 240 decibels.

For convenience in correlating the last named two scales with elements of other discs, the radius of the inner edge of scale 30 may be indicated as 1⅝ inches, and the radius of the inner side scale 31 as 1⅜ inches, the difference being the radial measure of the space occupied by scale 31.

In addition to the last named two scales there is formed on the lower part of the base 20 an intermediate radius logarithmic scale 32 defining values of microvolts/50 ohms, which will give a 13 db mean carrier power to mean noise power ratio. Its inner radius is about ⅝ inch less than the radius of the disc 21 on the drawing, which would be about one inch on the full size device as heretofore made. It extends over a radius of approximately 95 degrees, its values ascending clockwise.

It may be noted at this point that the scales 30 and 31 have divisions which equal approximately one degree of angle with respect to the pivot 19, and that correspondingly each degree of movement of superiorly located members relative thereto will represent a value of one decibel on these scales.

Mounted immediately over the base 20, there is the disc 21 having a fiduciary mark 18*a* at its periphery initially aligned with the base fiduciary mark 18, and this disc 21 is formed with cut out slots 30*a*, 31*a*, and 32*a*, concentric with the pivot 19, and located respectively in angular and radial positions to expose respectively part of scale 30, scale 31, and scale 32 when the fiduciary marks are aligned. The slot 30*a* includes an angle of 95 degrees, the slot 31*a* includes an angle of 125 degrees, and slot 32*a* extends over an angle of 55 degrees, although these lengths may be varied as discretion dictates.

The disc 21 has at its right hand side a marginal logarithmic scale 33 extending over approximately 70 degrees, symmetrically located with the scale 28 and formulated in values of watts of power output. At a suitable point on the periphery of the disc medially of the scale 33 there is formed a triangularly shaped pointer and index "A" printed on the face of the disc. At the opposite or left hand side of this disc 21 there is formed a marginal scale 35 formulated in values of receiver noise measured in decibels. In addition, on this disc 21 there is formed a scale 37 representing decibel values of "S/N" (meaning "signal-to-noise ratio"). This scale is effective with the scale 31 which falls under the adjacent slot 31*a* when the parts are assembled, and is marked with values in units of ten, of the same angular extent as the divisions of the scale 31 exposed through the slot and reading in values increasing counter-clockwise and of the same values as those numbered on the lower part of the scale 31.

Over the disc 21 in turn is a disc 22 sufficiently smaller in diameter to expose the scales 33 and 35 and accompanying legends. A pointer or index "B" is printed intermediately of the scale 42, and another index "M" intermediately of the scale 40 also printed on disc 22. In addition, the disc 22 is formed with concentric slots 30*b* radially coincident with slot 30*a* at zero positions of the discs, and 31*b* coextensive in arc at least with slot 31*a* and inclusive of the scale 37 in addition to part of the scale 31. For this purpose the slot 31*b* is wider in a radial direction than the slot 31, equalling the radial extent of the latter and also the radial extent of the area of scale 37.

At initial positions of the parts the slot 31*b* extends clockwise beyond the zero of the scale 31 and zero of scale 37, and the identifying legend as follows: "Below 0 db S/N" accompanying scale 37.

The disc 22 is also formed with a circumferential symmetrical notch 38 extending over an arc of about 20 degrees so located as, and of sufficient radial depth, to uncover a part of the slot 32*a* and scale 32, a pointer and index "T" being printed on the margin of the disc beside the notch, with an accompanying legend: "Threshold in microvolts/50Ω."

On its left hand margin the disc 22 has a scale 40 extending over approximately 170 degrees of arc, with numbered divisions from 70 to 240, and having the identification: "Received power (—dbw)." At a point intermediately of this scale a pointer or index "M" is printed on the disc 22, cooperative with the scale 35 ("Receiver noise figure") on disc 21, this index being adjacent a low value on the latter scale at the initial or zero positions of the members. On the right hand margin of the disc 22 a logarithmic scale 42 is printed, its values increasing clockwise and having an angular extent of arc of about 55 degrees. It is marked "Paraboloid antenna diameter (ft.)" and intermediately thereof a pointer or index "B" is printed on the disc 22, coactive with the "Power output" scale 33 on the disc 21 thereunder.

The disc 23 next above is formed with a slot 30*c* of the same arcuate extent and radial width as the slots 30*a* and 30*b*, so as to expose the counterclockwise scale 30 on the base member fully at the initial or zero positions of the members, and in addition has thereon an arcuate clockwise-ascending scale 44 reading from zero ("0") to 120, with its base edge at the same radius as the outer side of the slot 30*c* and its zero midway of the slot 30*c*, registered beside the 130 bar of the scale 30. Also, in addition, this disc has thereon a parallel clockwise-ascending scale 45 with divisions registered with those of the scale 44, but of double the values per unit and reading from zero aligned with "20" on scale 44, to 140 aligned with "90" on scale 44. This disc has on its right hand side a clockwise reading logarithmic scale 46 a duplicate of the "Paraboloid antenna diameter" scale 42 with similar divisions of the same values and symmetrically positioned in relation to the scale 42, and also having the descriptive legend "Paraboloid antenna diameter (ft.)." A diamond-shaped or double pointer or index "C" is also printed on the margin of this disc medially of the scales 42 and 46, one end point cooperative with the scale 42, and the opposite point operative with a scale 53 on the next disc 24 thereabove. It is marked with a capital letter "C."

At the left hand side of the disc 23 a pointer or index "N" is printed and at the zero or initial portions of the pivotally connected members is located approximately at 140 on the 70-to-240 "—dbw received power" scale 40.

In the area of the disc 23 above the last named index a "Median reliability" scale 49 or series of divisions relating to low efficiency transmission periods of the year arranged clockwise in order from a relatively high value represented by an annual median received signal level, through a worst month median, the value of signal level equal to the highest median in the worst 10% of the hours of the worst month, to the median of the worst hour of the year. These values may be discovered through sustained observations of reception at the locality under investigation, in accordance with and by, practices well understood. They enable the inclusion in computations of definite conditions which affect the long time operation of a receiver.

As above indicated conditions favorable or unfavorable to communication by scatter propagation of radio signals vary throughout the day and from season to season, and the last named scale might be material to the planning of a permanent installation for predetermined short or long part time operation, or for continuous operation throughout the year. The interpolation of such factors will be governed or dependent on the last indicated length of period of required operation. Thus, for a full time availability throughout the year, the worst hour of the year would be a material factor, but if only summer time activity is required, a lower transmitted power may be required to give the required reliability.

There is a variation in monthly median signal levels throughout the year of as much as plus or minus 10 db, will the low values occurring in the winter and the high values in the summer. Climatic conditions, latitude, terrain, and path length all have an effect on the variations of the received level. The dial or disc 24 is moved so that the appropriate "hourly median" is opposite the pointer printed on its left hand margin and having the letter "P" thereon to identify it.

On the other hand, at locations where excessive seasonal variations are not manifest, the scale 49 and pointer P may be ignored or may be omitted from the computer, the margin of disc 23 where this detail is shown in the instant case being left blank. It is also possible that this class of factor may be in effect introduced into the computation at other scales of the device by those workers who understand the nature of phenomena manifest in the locality being evaluated.

The disc 23 is also printed with a concentric scale 51 of antenna gain degradation reading clockwise from zero to 70 db over an arc of approximately 65 degrees in the upper right hand surface of the disc 23. The radius on which the last named scale is based—that is, the inner boundary of the area occupied by the scale—is the same as or slightly more than the radius of the outer boundary of the scale 45. In addition, this disc has printed at intervals on areas of the same radius the word "None" repeated at spots preceding the zero of the scale 51. The divisions of this scale represent decibels of antenna gain degradation according to the positions of the members thereover, a coextensive initially registered slot 52 being formed in the disc 24 pivoted next above the disc 23 to permit viewing of the scale.

The disc 24 has a wide arcuate slot 30*d* cut therein at the right hand side, positioned so as to expose a substantial portion of scale 30, nearly all of scale 44 and all of scale 45 when the fiduciary mark 18*d* is aligned with those of the other discs. This slot extends over an angle of approximately 150 degrees. Its lower part and parts of scales 44—45 also extend a little into the left hand area of the device. In the left hand portion of the disc 24, a slot 31*d* of the same radial dimensions as, but shorter arc, and initially registered with the slot 31*c*, is formed lapping the slots 31*b* and 31*a* so as to expose parts of scales 31 and 37.

This disc 24 also has printed thereon at the right a marginal logarithmic scale 53 extending over an arc of approximately 45 degrees and reading clockwise from 50 mcs. to 10,000. An index pointer identified by letter "D" is also printed at the right hand margin of this disc, so as to coact with the scale 46 of the paraboloid antenna diameter and initially located near the low-value end of the last named scale.

The disc 24 has formed on its left hand upper margin a logarithmic scale 55 representing percentage of short term (within the hour) reliability, related to differences in effectiveness of reception with a single antenna path ("No diversity") representing values of 50, 70, 90, and intermediate values to 99.99, clockwise, over an arc of approximately fifty degrees.

A pointer or index marked "Q" is printed on the disc 25, next above, initially located at a low value on the scale 55. A second marginal logarithmic scale 57 having the same numerical markings as scale 55, but within a shorter arc, is formed on the disc 24 below the scale 55, but derived from "dual diversity" reception; and another index pointer identified by an "R" thereon is printed on the left margin of the next disc 25 for use with the last named scale when two receiver antennas are used. A third marginal logarithmic scale 59 with the same numerical markings as the last described two, but of still further reduced arc related to triple diversity reception is marked on the disc 24 at the lower left hand part, and still another independent pointer or index having the letter "S" thereon is printed on the margin of the superposed disc 25 to coact with the last described scale when third order diversity is employed. The diversity signals are assumed to be uncorrelated; a switch or selector type diversity system which chooses the stronger (strongest) signal is assumed. The diversity signals may be originated from spaced antennas, separate transmission frequencies, or any other scheme which provides uncorrelated signals at the point of selection. The three pointers last named are marked "No diversity," "Dual diversity," and "Triple diversity," respectively.

The disc 25 is formed at its upper part with a notch 61 the bottom of which is of the same radius as the inner side of slot 52, and scale 51, so that a part of the slot is uncovered, and a part of the scale made visible. Beside the bottom of the notch 61 a short logarithmic scale 62 having units 50 to 500, clockwise is formed, marked "Path length (mi.); antenna gain degradation." This is intended to indicate that the ordinal on scale 62 representing the length in miles of the proposed path is compared with the part of the scale 51 exposed in notch 61 and by the previous adjustment of the discs 24 and 25 by indexes "D" and "E," and the number on scale 51 appearing beside the division of scale 62 representing the path length will be the particular extent of degradation (out of the several in view) applicable to the computation in process.

The disc 25 is further characterized by a slot 63 at its lower part across a diameter coincident with the fiduciary mark 18*e* on this disc, located over, and of the same radial dimension as, the slot 30*d*, but of much shorter arc, extending over only about 30 degrees (compared to 150 degrees for slot 30*d*) and so located on the disc as to lie intermediately of the ends of the slot 30*d*, thus uncovering a measure of about twenty decibels on the scales 44 and 45 thereunder.

A pointer or index marked "F" is printed at the inner edge of this slot 63, cooperative with scale 44, and at the outer edge of this slot a pointer or index is printed, three units, more or less, lower on the scales 44 and 45 marked "H" and cooperative with the scale 45. A legend explaining the functions of the indexes F and H is printed above the slot, reading as follows: "Total antenna gain over isotropic," and to the right of index F its function is defined by the legend "Non-paraboloid" while thereunder, relating to the lower pointer H and scale 45, the legend "Paraboloids equal diameter" appears. Thus, in use of these indexes, the one ("F") would be used for, say, a yagi array, while the lower one "H" would be used for paraboloid antennas where both are of the same diameter and frequency, in addition to the components involved at scales 46 and 53 ("Paraboloid antenna diameter"), where values of antenna diameter and frequency are introduced. Also on the disc 25 an index lettered "E" cooperative with the scale 53 of megacycle frequencies is printed.

A final concentric scale 67 graduated in values of transmission line loss is printed at the right on the disc 25 outwardly of and near to the slot 30*e*, reading from a zero value counterclockwise to 40 db, the high point on this scale extending slightly above the adjacent upper end of the slot 30*e* for coaction with the compensator sector or differential indicator and double pointer plate 26 before mentioned. The latter is a sector-shaped member of sheet material similar to that from which the discs described are made. It has an upper part of major radius, stopping short at the inner edge of the scale 67, and having a pointer with the letter "J" thereon cooperative with the scale 67, and having a lower offset part of shorter radius stopping at the inner edge of the slot 30*e*, printed with a pointer or index marked "K," the point of which is at the slot 30*e*, cooperative with the scale 30 of Received Power values printed on the base plate 20, as earlier described. The base member and superposed discs and sector 26 may be formed of any suitable sheet material with a good face suitable for printing the scales, pointers and legends described, and preferably waterproof. The illustration in Figure 2 is approximately three quarters the full size of devices which have been made and used as computers or calculators by radio engineers engaged in planning, designing and constructing transmitting and receiving stations for effecting transmission of intelligence by forward scatter propagation of radio signals.

In practice it is possible to set up a multihop scatter communication system which will consist of an initiating transmitter and a relay station consisting of a receiver and a relay transmitter and possibly two or more of such relay stations, with a terminal receiver construction to receive signals from the last intermediate relay.

In such relay system, the relay transmitter has been operated on a different frequency from that of the received signal to avoid interference with the receiver. While this repeater method resembles a present system of line-of-sight transmission of V. H. F., U. H. F., and microwave signals, owing to the greater distances which may be covered by the scatter-propagated signals, the amount of apparatus and number of relays is reduced to a pronounced extent.

The instructions for the use of the computer are as follows:

*Operation of the computer for non-paraboloid antennas*

(1) Set index A to the effective path length on scale 28 between projected transmitter and receiver expressed in miles. (The effective path length ($d'$) is the actual path length ($d$) plus $\theta/.0107$, where $\theta$ is the sum of the angles of elevation of both the transmitting and the receiving antennas from the smooth earth horizon. If the ratio of effective to actual path length is greater than 1:1, add the following quantity to the received power: $20 \log. d'/d$.

(2) Set index "B" to the transmitted power in watts.

(3) Set index "E" to the transmission frequency indicated at scale 53.

(4) Set index "C" to index "B."

(5) Set proposed mc. frequency on scale 53 to register with opposite end of index "C."

(6) Set index "F" to total antenna gain over isotropic antenna.

(7) Set the frequency on scale 53 to index "C," maintaining the previously set position of index "E" in relation to this scale 53.

(8) Set index "J" to the total transmission line loss, and read the received power in −dbw as indicated by index "K."

*Operation of the invention with paraboloid antennas*

(1) Set index "A" to the effective path length, using the formula in (1) above.

(2) Set index "B" to the transmitted power in watts.

(3) Set index "C" to the diameter of the smaller antenna.

(4) Set index "D" to the diameter of the larger antenna.

(5) Set index "E" to the transmission frequency.

(6) Check the antenna gain degradation scale and note the degradation if any for the effective path determined in (1). If the antennas are of equal diameter, add the antenna gain degradation to the total transmission line loss. If the antennas are of different diameters, add 3 db less degradation to transmission line loss.

(7) Set index "J" to the total transmission loss (plus antenna gain degradation, if any).

(8) Read the received power in dbw as indicated by index "K" and record this number. The practicability of operating a receiver station at the site under consideration may be judged by this figure.

*Operation of the invention to determine the number of db above threshold and the signal-to-noise ratio in the noisiest channel of a typical receiver*

(1) Set index "L" to the receiver bandwidth (between 3 db points).

(2) Set index "M" to noise figure in db on scale 35.

(3) Set index "N" to the received power (in −dbw) on scale 40.

(4) If scale 49 is used, set index "P" to the value of the hourly median desired. If 90 percent long term reliability is desired, set this index to "worst month" on this scale; if 99 percent long term reliability is desired set index to "worst 10 percent of worst month" (which represents 10 percent of the number of hours in the worst month); if 99.99 percent long term reliability is required, set the index to "worst hour of year." Alternate in case scale 49 is not used, omit step 4 and proceed as in 5, 6, etc. following.

(5) Set index "Q," "R," or "S" (depending on whether no diversity, dual diversity, or triple diversity is to be employed) to the short-term reliability required (that is, the percentage of time the signal-to-noise ratio, etc., shall be exceeded by the output signal in the chosen hour).

(6) The number of db above FM threshold (13 db, carrier to noise ratio), is then given by index "U" on scale 31 in slot **31*e***.

(7) The broadband (4–68 kc.) noise output of the radio receiver set is given by index "U" on scale 37, in slot **31*e***.

(8) The signal-to-noise ratio in the noisiest channel of a typical multiplex equipment, the Telephone Terminal AN/TCC–7, is indicated on scale 37 in slot **31*e*** by index "W."

On occasion it becomes necessary to make a hasty survey and estimate of the possibilities of a proposed site for a receiving station to receive tropospheric scatter communications from a known established or a proposed transmitter station, when no compilation of local impedance and other limiting phenomena peculiar to the proposed site or sites is available, and urgency precludes the making of the necessary observations to determine these. In such cases, it is possible to make a reasonably useful determination by the use of my invention, and by assuming a normal set up of a conventional transmitter and receiver at the proposed path ends, and interpolating into the computer factors which may be estimated with a reasonable approximation of actuality by experience and general knowledge of conditions in the area involved.

This slide rule computer has been constructed and calibrated such that 10° of rotation of any scale corresponds to a 10 db change in the resultant Received Signal Level, db above threshold, signal-to-noise, or noise level. In the determination of antenna gain degradation, the calculator is calibrated so that a change in setting of either frequency, antenna diameter, or path length (scale 62 only) of a certain number of degrees causes a similar change in the antenna gain degradation.

It should be understood that the foregoing disclosure is exemplary, and it will be understood that various modifications of the specific structure shown and described may be made without departing from the spirit of the invention within the scope of the appended claims.

For definitions of terms, support for statements as to the factors involved in the operation of the device disclosed above, and methods for sensing, detecting, registering and measuring or evaluating such factors, reference may be made to the following publications in the "Proceedings of the Institute of Radio Engineers," vol. 43, issue of October 1955:

| | Page |
|---|---|
| Foreword | 1173 |
| Editorial: Kenneth A. Norton and Jerome B. Wiesner | 1174 |
| "Characteristics of Beyond-the-Horizon Radio Transmission," Kenneth Bullington | 1174 |
| "Radio Transmission at V. H. F. by Scattering and Other Processes in the Lower Ionosphere," D. K. Bailey, R. Bateman and R. C. Kirby | 1181 |
| "U. H. F. Long-Range Communication Systems," G. L. Mellen, W. E. Morrow, A. J. Pote, W. H. Radford and J. B. Wiesner | 1269 |
| "Diversity Reception in U. H. F. Long Range Communications," C. L. Mack | 1281 |
| "Demonstration of Bandwidth Capabilities of Beyond-Horizon Tropospheric Radio Propagation," W. H. Tidd | 1297 |
| "Results of Propagation Tests at 505 mc. and 4,090 mc. on Beyond-Horizon Paths," K. Bullington, W. J. Inkster and A. L. Durkee | 1307 |
| "Investigations of Angular Scattering and Multipath Properties of Tropospheric Propagation of Short Radio Waves Beyond Horizon" | 1317 |
| "Some Tropospheric Scatter Propagation Measurements Near the Radio Horizon," H. B. Janes and P. I. Wells | 1336 |
| "Some Fading Characteristics of Regular V. H. F. Ionospheric Propagation," G. R. Sugar | 1432 |

An exhaustive discussion of radio propagation and factors affecting communication at V. H. F. and U. H. F. prior to 1950 including methods, formulas and equations for the evaluation of these factors, is contained in "Radio Propagation" TM11–499 published by the Department of the Army, August 1950, available from the Government Printing Office. Reference is made additionally thereto for instruction as to steps of procedure for deriving components or factors of computations to be carried out with the instrument disclosed, where necessary. The exact procedures followed in the determination of the relationships of the parameters involved is given in "Engineering Report No. E–1174, The Scatulator," dated February 23, 1956.

Additional articles of general use in the subject of scatter propagation of radio waves, are also contained in the above mentioned issue of the proceedings of the IRE. Some of these deal with special conditions such as irregular terrain in the proposed path, turbulence in the ionosphere, anisotropic turbulence and turbulence in the atmosphere, indicating how application of the above invention may be effected.

Other source publications may be noted, among which are:

Cheyenne Mountain Tropospheric Propagation Experiments, N. P. Barsis, J. W. Herbstreit and K. O. Hornberg, N. B. S. Circular 554, December 1954.

Forward Scatter of Radio Waves (Part 1) Philco Tech. Rep. Division Bulletin, March-April 1956 (vol. 6, No. 2, p. 13. (Part 2) May-June 1956, vol. 6, No. 3, p. 2.

Having now disclosed the complete instrument for the uses indicated, and instructions for its manipulation, operation and application to the uses contemplated, I claim:

1. In a computer of the character described, a slide rule computer comprising a base member and a plurality of superposed members mounted for sliding movement relative to said base and relatively to each other, said members having scales marked on certain portions thereof and indexes on certain superiorly located other portions thereof cooperative with said scales, said scales including essentially one formulated in units of effective path length of a proposed line of transmission by forward scatter propagation, one having units of power output, one having units of frequency of signal carrier, at least three alternative scales and respective superiorly located indexes expressing graduated values of antenna gain values and performance with respectively no diversity, dual diversity and triple diversity; a scale of antenna gain degradation formed on a lower member, and a reduced length scale of path length on the next highest member positioned to align in apposition with said scale of antenna gain degration. The last named two scales having units ascending in value in the same direction whereby indicated degradation on the first of the last named two scales may be modified by the relative mileage length indicated by the second named one of the two; a lower one of said members having a scale of received power in dbw and a coacting index on an intermediate member thereabove, whereby an approximate difference in transmitted and received power is indicated by the last named index and the index cooperating with said scale of power output, a scale of transmission line loss on the uppermost member, a scale of received power on the base member under the last named uppermost member, said uppermost member and intervening members being shaped to clear a part of the last named scale for viewing of a significant part according to the adjustments of the several members with said indexes in relation to coacting associated said scales, a scale of transmission line loss, and a terminal index slide having an index operative in relation to the last named scale, and having a second index operative in relation to said scale of received power, the two indexes last named being spaced so that when the first is set at the total transmission loss on said scale of transmission line loss, the second of these two indexes will point to a figure on the scale of received power.

2. The structure of claim 1 in which respective intermediate members are formed with duplicate scales of units of paraboloid antenna diameter and respectively next superior members are formed with indexes effective therewith in a relation to affect the received power otherwise indicated by the device of claim 1, by a measure proportionate to the values of antenna diameters indicated by the last named indexes.

3. A computer for indicating efficiency of transmission of a given radio signal by forward scatter propagation over a stated proposed geographical path, between an identified transmitter and a proposed receiver, comprising a base member having thereon a center pivot and a marginal fiduciary mark, a marginal concentric approximately logarithmic first scale formed thereon at one side extending over an arc of approximately eighty degrees calibrated in terms of length of transmission path in miles; a circular second member concentrically on said pivot next over the base member having a radius reduced to expose said margin of the base member and said first scale and having a fiduciary mark thereon to align with the first named fiduciary mark at a zero position of the members, the second member having thereon a marginal logarithmic second scale symmetrically located in relation to said first scale covering an arc on the disc of approximately 70 degrees said second member having also thereon an index beside and coacting with the first scale; and defining measures of power output in watts; a circular third member concentrically pivoted on said pivot over the second member reduced in radius to expose the second scale and having a fiduciary mark thereon arranged to be aligned with the other said marks at a zero position and having thereon a concentric marginal logarithmic third scale extending over an arc of approximately forty-five degrees symmetrically located with respect to the first and second scales at zero position, formulated in units of paraboloid antenna diameter and having also thereon an index medially of the second scale at zero position; a circular fourth member concentrically pivoted on said pivot reduced in radius to expose the third scale and having thereon a fiduciary mark for alignment with the others named at zero position and having thereon a concentric marginal logarithmic fourth scale subtending the same degree of arc as the third scale, and symmetrically located relative to the latter, formulated in units of paraboloidal antenna diameter, and having an index medially of the last named scale and coactive with the same; a circular fifth member concentrically pivoted on said pivot of further reduced radius to expose the margin of the fourth member and said scale on the latter, and having a fiduciary mark to align with the others afore named; a concentric marginal logarithmic fifth scale on the fifth member subtending the same degree of arc thereon as the fourth scale and expressing units of frequency in megacycles said fifth member having also an index thereon coactive with and near the low end of the fourth scale when the said marks are in zero relation; said fifth member having also thereon three concentric logarithmic marginal sixth, seventh and eighth alternative scales spaced circumferentially from the said fifth scale and from each other, each of the three scales last named formulated in similar terms of effective reception respectively with no diversity, dual diversity and triple diversity but being successively shorter in arc in the order named and a circular sixth member concentrically pivoted on said pivot of less radius than the said fifth member to expose the named scales on the latter and having respective indexes coactively located adjacent the respective scales on the fifth member, said fourth member having thereon a concentric ninth scale with divisions representing values of antenna gain degradation extending clockwise over an arc of at least fifty degrees from zero decibels to forty decibels at least, said fifth and sixth members being slotted to expose a part of said ninth scale over an arc of approximately fifteen degrees, said sixth member having beside the slot therein a tenth scale coextensive in arc with the slot and graduated in miles of path length from low miles value clockwise to major miles value, so that divisions on the tenth scale will lie adjacent a range of values on the ninth scale and indicate a discrimination between the last named values according to the mileage selected in the tenth scale variable in value also by pivotal movement of the sixth member relatively to the others; said base member having also thereon a concentric eleventh scale of much reduced radius covering an arc of approximately 175 degrees graduated in terms of decibels above one watt of received power counterclockwise from a low number to a high number, said members thereover being slotted to expose a substantial part of the eleventh scale through the sixth member, said sixth member having thereon a concentric twelfth scale of greater radius but less arc than that of the tenth scale graduated in terms of decibels of total transmission line loss from zero counterclockwise and beyond the last named slot in the sixth member, and a sector member pivoted on said pivot having a part of major radius with index terminating at the edge of the twelfth scale, and having a part of shorter radius with an index terminating at the inner edge of the last named slot in the sixth member and edge of the eleventh scale, whereby when the major radius index on said sector is set at the loss derived from the algebraic values of indications in successive operations of the members named, the index of shorter radius on said sector will indicate on the eleventh scale a value of received power.

No references cited.